Jan. 3, 1961 E. CHELEWSKI 2,966,982

BALE LOADER AND TRAILER

Filed July 29, 1958 2 Sheets-Sheet 1

INVENTOR.
EDMUND CHELEWSKI
Edmund Chelewski

INVENTOR.
EDMUND CHELEWSKI
Edmund Chelewski

United States Patent Office 2,966,982

Patented Jan. 3, 1961

1

2,966,982

BALE LOADER AND TRAILER

Edmund Chelewski, Ansley, Nebr.

Filed July 29, 1958, Ser. No. 751,695

8 Claims. (Cl. 198—7)

This invention relates to farm machinery and more particularly to a device for gathering bales.

It is an object of the present invention to provide a combined farm trailer and bale loader that will automatically engage and elevate a bale to a proper height for manual loading upon a tractor drawn trailer.

Another object of the present invention is to provide a tractor drawn trailer having a completely self contained bale loader removably secured to one side thereof and powered by the rotation of the wheel and actual assembly of the trailer.

Still another object of the present invention is to provide a combined trailer and bale loader of the above type that includes guide means for directing the bale onto the power driven conveyor of the loader for elevating such bales to a proper height for manual removal thereof and proper stacking upon the trailer.

Other objects of the invention are to provide a bale loader and trailer bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which.

Figures 1, 2, 3, 6, 7:
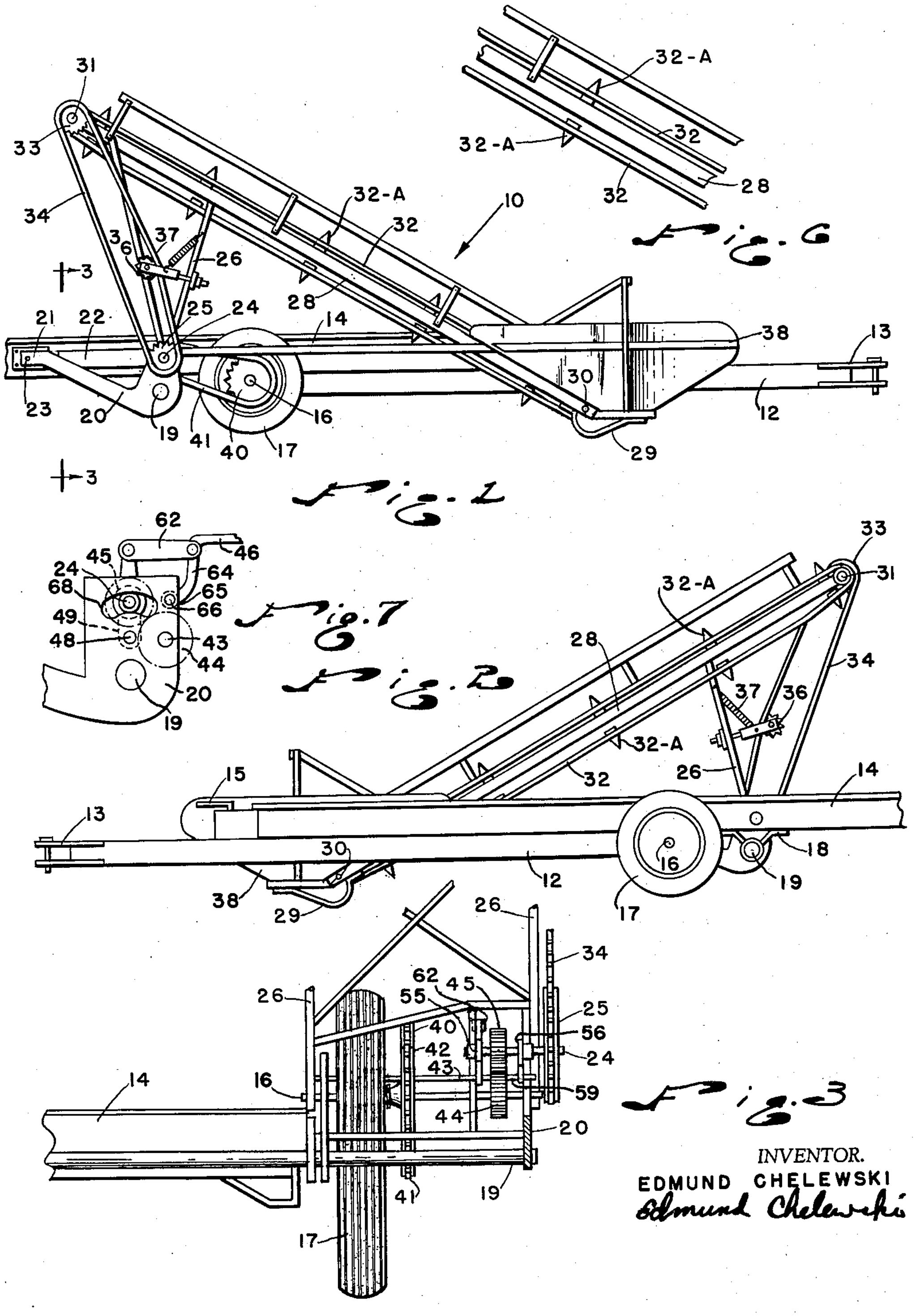
Figure 1 is a side elevational view of a combined trailer and loader made in accordance with the present invention.
Figure 2 is a side elevational view from the opposite side of the trailer shown in Figure 1.
Figure 3 is an enlarged view taken along line 3—3 of Figure 1.
Figure 6 is an enlarged fragmentary side elevational view of certain parts of the conveyor forming a part of the present invention.
Figure 7 is a fragmentary view of crank 20 with associated parts operable by the operating lever.
Figures 5, 8:
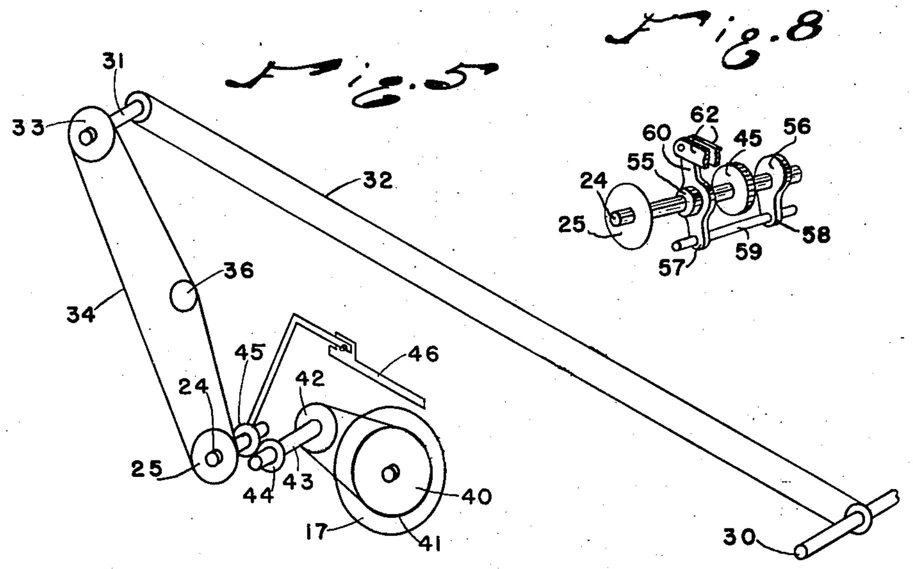
Figure 5 is a schematic diagram of the drive means associated with the bale loader.
Figure 8 is a schematic perspective view showing shaft bearings with shafts and gears which can be moved into and out of operative position.
Figure 4:
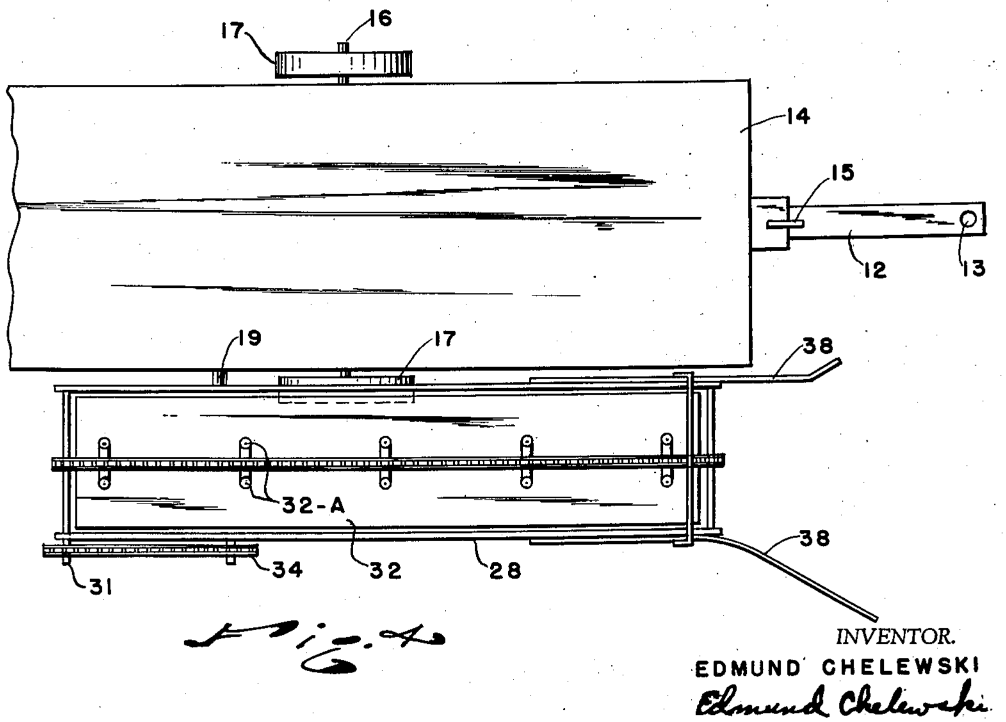
Figure 4 is a fragmentary top plan view of the apparatus shown in Figure 1.

Referring now more in detail to the drawing, a combined trailer and bale loader 10 made in accordance with the present invention is shown to include a main frame 12 having a tractor hitch 13 at one end and pivotally supporting a platform 14 at the opposite end. Manually operated rotatable latch means 15 acting between the frame 12 and platform 14 releasably maintains the platform in a parallel position with the frame. However, in response to actuation of such latch, the rear end of the platform 14 will drop into engagement with the ground for various unloading, loading and auxiliary functions.

The combined platform and underframe unit is supported upon a wheel and axle assembly 17, 16, respectively. A pair of brackets 18 secured to the bottom of the platform 14 adjacent to the rear end of the underframe 12 slidably receives a support bar 19 that has a crank 20 secured to its outermost end. This crank 20 terminates in a torque arm 21 that is releasably attached to a bracket 22 on the side of the platform 14, such as by removable pin 23. The opposite end of the crank 20 includes a bearing for rotatably supporting a shaft 24 to which a sprocket wheel 25 is secured. This shaft 24 also includes a pair of upwardly extending and parallel braces 26 which furnish a support for the upper extremity of an upwardly and rearwardly inclined conveyor frame 28. Gear 45 is normally in mesh with gear 44 when the loader is traveling during work. Shaft 24 is carried by two movable bearings 55 and 56, said bearings 55 and 56 having lower extensions 57 and 58 with a rigid bar 59 extending therebetween and supporting the same, the bearing 55 having an upper extension 60 in alignment with the lower extension 57. Double bar links 62 are connected with the upper end of extension 60 and at the opposite ends thereof with the lower end portion 64 of arm 46 which is connected at its lower end 65 to crank 20 by pivot pin 66. A cam slot is formed in crank 20 through which the end of shaft 24 extends. Bearings 55 and 56 are movable about rigid bar 59 whereby upward movement of arm 46 operates links 62 to move shaft 24 rearwardly, which draws gear 45 out of mesh with gear 44 to stop operation of loading mechanism when loader is in travel. The downward movement of lever 46 will cause the gears 45 and 44 to again become engaged and the loading mechanism ready to operate with movement or travel of the loader.

As is more clearly shown in Figures 1 and 2 of the drawing, the conveyor frame 28 has a skid 29 at its lowermost end for sliding engagement along the ground as the unit is propelled. Lower and upper transverse shafts 30, 31 are rotatably supported at opposite ends of the frame 28, around which an endless conveyor belt 32 is trained. This belt is further provided with spaced apart lugs 32A that frictionally engage the bottom of the bale being loaded so as to prevent slippage therebetween. The sprocket wheel 33 secured to the upper shaft 31 of the conveyor is driven in response to rotation of the sprocket wheel 25 supported upon the shaft 24, by means of a chain 34. A chain tightener 36 maintains the proper tension at all times in response to the constant pull upon the associated tension spring 37.

In actual use, the trailer and loader device is pulled along by a tractor hitched to the hitch 13. A guide plate 38 on opposite sides of the lower end of the frame 28 direct the bale into engagement with the conveyor belt 32 as the unit is moved toward such bale. A drive sprocket 40 secured to the wheel 17 rotates on shaft 16 by means of a sprocket chain 41 that is in driving engagement with another sprocket wheel 42 that is secured to an axle 43 which has secured onto a gear 44 that is in meshing engagement with a gear 45 secured to axle 24. Thus, the power for operating the conveyor is in the form of a take-off from the wheel 17 which is rotated on axle 16 in response to the pull upon the underframe 12 by the tractor hitched thereto. As the bales are elevated upon the conveyor, a workman standing upon the platform can readily lift each bale from the conveyor and stack it upon the platform 14. After the platform has been completely filled, it is only necessary to slide the stack of bales off of the platform in any suitable manner, such as by tilting the platform by releasing the latch 15 or by pulling the entire stack of bales off by means of a cable, or the like. The trailer is then immediately ready for the next load. If it is desired to use the trailer without the bale loader, or to put the trailer out of gear, it is only necessary to pull on lever 46 secured to sprocket gear 45 to disengage the driving means for loading bales of hay.

The front of the bale loader may be raised off the ground by means of a hydraulic cylinder which will enable the loader to come in contact with the ground only long enough to pick up each successive bale of hay.

While various changes may be made in the detail construction, it shall be understood that such changes shall be within the spirit and scope of the present invention as defined by the appended claims.

What I claim as new and desire to protect by Letters Patent of the United States is:

1. A combined trailer and bale loader comprising, in combination, a wheel and axle assembly upon the loader, an underframe supported upon said wheel and axle assembly, a platform pivotally supported upon said underframe, manually controlled means for selectively locking said platform against rotation upon said underframe, an upwardly and rearwardly inclined chute secured to one side of said platform, conveyor means carried by said chute, drive means acting between said underframe and said chute operated by movement of the wheel of the wheel and axle assembly due to movement of the bale loader over the ground for operating said conveyor means, and gearing means to inactivate said conveyor means and allowing continued movement of said wheel of the wheel and axle assembly during movement of said bale loader over the ground.

2. The combination according to claim 1, further comprising a guide at the lowermost end of said chute for directing bales into engagement with said conveyor means.

3. The combination according to claim 2, wherein said manually controlled means comprises a releasable latch normally preventing rotation of said platform relative to said underframe about the longitudinal axis of said wheel and axle assembly.

4. The combination according to claim 3, wherein said conveyor comprises a lower shaft and an upper shaft journalled at opposite ends of said chute, and an endless belt extending around said shafts having upwardly projecting lugs.

5. The combination according to claim 4, further comprising a support shaft releasably supported upon said upper frame, and a brace carried by said support shaft supporting the upper end of said chute.

6. The combination according to claim 5, wherein said sprocket connection comprises a sprocket wheel secured to said upper shaft, a sprocket wheel secured to said support shaft a chain engaging said sprocket wheels, and means transmitting power from said axle to said support shaft for rotating said sprocket wheels.

7. The combination according to claim 6 wherein said transmitting power means comprises a gear secured to said support shaft, and a lever secured with said support shaft for operating said conveyor means.

8. In combination, a wheel supported baler including a wheel and axle assembly, an underframe supported upon said wheel and axle assembly, a platform pivotally supported upon said underframe, manually controlled means for selectively locking said platform against pivoting upon said underframe, an upwardly and rearwardly inclined chute secured to one side of said platform, means for pivotally supporting the upper end of said chute relative to the ground, a skid attached to the lowermost end of said chute for sliding engagement along the ground, a drive sprocket secured to the axle of said wheel and axle assembly, a first driven shaft rotatably supported upon said underframe and arranged parallel with said axle, a driven sprocket upon said first driven shaft, a chain means in driving engagement with said drive sprocket and said driven sprocket, a driven gear rigidly secured to said first driven shaft, a second driven shaft movably supported by said platform and parallel with said first driven shaft upon said underframe, a second driven gear mounted upon said second driven shaft and arranged in alignment with said first driven gear, transverse shafts rotatably supported at opposite ends of said chute, an endless conveyor belt trained over said shafts, pick-up lug means mounted upon said endless conveyor, chain means connecting said second driven shaft with the upper transverse shaft on said chute for driving said endless conveyor, said first driven gear driving said second driven gear when in engagement therewith thereby driving said endless conveyor during movement of the wheels of said wheel and axle assembly upon the ground, and manually operable means connected with said second driven shaft for moving the same toward and away from said first driven shaft to engage and disengage said first and second driven gears, whereby said conveyor can be inactivated and at the same time allowing continued movement of said wheels, their axle, and the first driven shaft during movement of the bales over the ground.

References Cited in the file of this patent

UNITED STATES PATENTS

| | | |
|---|---|---|
| 1,306,597 | Krogen | June 10, 1919 |
| 2,256,830 | Johnson | Sept. 23, 1941 |